United States Patent [19]
Smith et al.

[11] Patent Number: 5,852,162
[45] Date of Patent: Dec. 22, 1998

[54] LOW MOLECULAR WEIGHT HYDROXY FUNCTIONAL POLYESTERS FOR COATINGS

[75] Inventors: Marc L. Smith, Highland, Calif.; Ronald J. Lewarchik, Sleepy Hollow, Ill.; Joseph J. Zupancic, Glen Ellyn, Ill.; Donald J. Algrim, Palatine, Ill.

[73] Assignee: Morton International, Inc., Chicago, Ill.

[21] Appl. No.: 883,984

[22] Filed: Jun. 27, 1997

[51] Int. Cl.$^6$ .................................................. C08G 63/02
[52] U.S. Cl. .......................... 528/272; 528/190; 528/192; 528/193
[58] Field of Search ..................... 528/190, 272, 528/192, 193

[56] References Cited

U.S. PATENT DOCUMENTS

| | | | |
|---|---|---|---|
| 4,319,017 | 3/1982 | Kosanovich et al. | 528/176 |
| 4,403,093 | 9/1983 | Hartman et al. | 528/297 |
| 4,659,778 | 4/1987 | Williams | 525/107 |
| 4,703,101 | 10/1987 | Singer et al. | 528/87 |
| 5,362,519 | 11/1994 | Argyropoulos et al. | 427/385.5 |

*Primary Examiner*—James J. Seidleck
*Assistant Examiner*—U. K. Rajguru
*Attorney, Agent, or Firm*—Wayne E. Nacker; Gerald K. White

[57] ABSTRACT

A polyester composition has a number average molecular weight $M_n$ of between about 500 and about 1000, a weight average molecular weight $M_w$ of between about 600 and about 2000, a polydispersity below about 2, preferably below about 1.8, hydroxyl functionality between 2 and 3, a hydroxyl value of between about 160 and about 260, and an acid number below about 10. Less than about 5% of the OH groups of the polyester are pendent, the rest being terminal. Between about 10 and about 50 wt % of the monomers used to form the polyester composition are anhydrides having the formula:

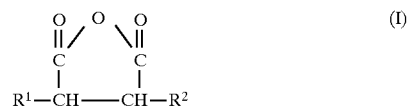

where $R^1$ is a non-aromatic, saturated or unsaturated hydrocarbon chain having between 6 and 30 carbon atoms, $R^2$ is hydrogen or a non-aromatic saturated or unsaturated hydrocarbon having between 1 and 8 carbon atoms, and $R^1$ and $R^2$ have, in total, between 8 and 30 carbon atoms. The polyester in conjunction with a hydroxyl-reactive curative provides a coating composition.

8 Claims, No Drawings

LOW MOLECULAR WEIGHT HYDROXY FUNCTIONAL POLYESTERS FOR COATINGS

The present invention is directed to low molecular weight polyesters having hydroxyl functionality, whereby they can be formulated into coating polymers with appropriate —OH—reactive cross-linking agents. More particularly, the invention is directed to such polyesters having large hydrocarbon side chains which act to reduce viscosity of coating compositions and provide coatings with enhanced flexibility.

BACKGROUND OF THE INVENTION

U.S. Pat. Nos. 4,403,093 and 4,659,778, the teachings of each of which are incorporated herein by reference, teach stepwise growth of polyesters. In stepwise growth, each step of chain elongation is carried out substantially to completion prior to a further polymer chain elongation step. Low molecular weight polyesters produced by such stepwise chain elongation are formulated with appropriate cross-linking agents to form coating compositions.

Of particular interest herein are hydroxyl functional, low-molecular weight polyester compositions formed by reacting a multi-functional alcohol (polyol) with carboxylic anhydrides in relative equivalents so as to provide a carboxyl-terminated chain composition, and subsequently reacting the carboxyl-terminated chain composition with sufficient levels of an oxirane-containing compound(s) so as to obtain a hydroxyl-terminated polyester. While the polyester has substantial terminal hydroxyl-functional, it contains substantially no internal or pendant hydroxyl functionality.

Herein, such polyester compositions are produced having low viscosities, whereby high solids coating compositions with low VOCs may be formulated. Surprisingly, coatings formed from the polyesters of the present invention provide cured coating compositions with enhanced flexibility. With the coating in liquid form, improved pigment wetting is observed through the use of polyesters in accordance with the invention.

Above-referenced U.S. Pat. No. 4,403,093 to Hartman et al. describes a polyester formed by reacting an anhydride with a diol so as to obtain a half-ester and subsequently reacting the half ester with a di-functional oxirane compound so as to form a hydroxyl-terminated polyester. The di-functional oxirane becomes incorporated internally within the polyester chain, providing two hydroxyl groups which are pendent from the chain, i.e., are non-terminal hydroxyl groups. The polyesters produced in this patent are cross-linked to form coatings. For purpose of the present invention, where a highly flexible coating is desired, the pendent hydroxyl groups are undesirable because they result in high cross-link density which reduces flexibility of the cured coating which is formed from the polyester and a cross-linker.

Above-referenced U.S. Pat. No. 4,659,778 also teaches low molecular weight polyesters which may be cross-linked. This patent, however, specifically teaches against the use of high molecular weight anhydrides, such as dodecenylsuccinic anhydride. Applicants, herein, find that such high molecular weight anhydrides when incorporated in short chain polyesters of low polydispersity provide coating compositions with low viscosity, excellent pigment wetting and provide coating films with high flexibility.

SUMMARY OF THE INVENTION

In accordance with the invention, there is provided a polyester composition having a number average molecular weight ($M_n$) of between about 500 and about 1000, a weight average molecular weight ($M_w$) of between about 600 and about 2000, a polydispersity below about 2, preferably below about 1.8, hydroxyl functionality of between 2 and 3, a hydroxyl value of between about 160 and about 260, preferably between about 180 and about 260, and an acid number less than 10 and preferably below about 5. Of the hydroxyl groups of the polyester, less than 5% are pendent from the chain (i.e., non-terminal). Between about 10 and about 50 wt % of the monomers used to form the polyester composition are anhydrides having the formula:

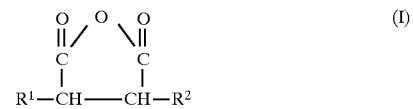

where $R^1$ is a non-aromatic, saturated or unsaturated hydrocarbon chain having between 6 and 30 carbon atoms, $R^2$ is hydrogen or a non-aromatic saturated or unsaturated hydrocarbon having between 1 and 8 carbon atoms, and $R^1$ and $R^2$ have, in total, between 8 and 30 carbon atoms. A preferred monomer of formula (I) is dodecenylsuccinic anhydride (DDSA) (alternately named dihydro-3-(tetrapropenyl)-2,5-farandione), generally available as a mixture of isomers.

The polyester, either alone, or in admixture with other polyesters, along with an appropriate hydroxyl-reactive cross-linking agent, such as an aminoplast resin or a blocked isocyanate, is useful as a coating composition.

DETAILED DESCRIPTION OF CERTAIN PREFERRED EMBODIMENTS

Polyester compositions in accordance with the invention are formed in a polycondensation reaction between polyols, predominantly diols, and anhydrides of dicarboxylic acids with dicarboxylic acids in sufficient amounts so as to provide polyesters at least partially terminated with carboxylic acid functionality followed by reaction with mono-oxirane compounds so as to produce hydroxyl-terminated polyesters of low molecular weight and low polydispersity.

The polyesters which are formed are substantially linear being the products of predominantly diols and anhydrides of di-carboxylic acids and capped by mono-functional epoxy molecules. However, a small amount of triols, e.g., trimethylol propane (TMP) may be used so as to provide some branching in some of the polyester chains. Preferably no more than about 10 mole percent, most preferably no more than about 5 mole percent, of the total polyol content comprises triols.

Polyesters in accordance with the present invention with the lowest chain lengths and lowest polydispersities may be conveniently formed in a stepwise reaction, i.e., by reaction, in a first step, of a polyol or polyol mixture with an anhydride or mixture of anhydrides at about one mole of anhydride per hydroxyl equivalent of polyol(s) to form a carboxyl-terminated chain composition, and, in a second step, reacting the carboxyl-terminated chain composition with a compound having mono-oxirane functionality or mixture of compounds having mono-oxirane functionality at at least an equivalent of the carboxylic acid functionality of the intermediate polyester chain.

However, polyesters in accordance with the invention can be produced in a simple polycondensation reaction between anhydride(s) and polyol(s) at a COOH/OH ratio of between about 2.00 and about 0.625 so as to form a polyester having at least some terminal carboxylic acid functionality and subsequently end-capping the chain with a compound having mono-oxirane (mono-epoxy) functionality.

Among the polyols which can be used are those which contain from about 2 to 20 carbon atoms. Preferred are aliphatic polyols, particularly aliphatic diols or triols, most preferably those containing from 2 to 10 carbon atoms. Examples include ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, 2-methyl-1,3-propanediol, dipropylene glycol, 2-methyl-1,3-propanediol, trimethylolethane, trimethylolpropane, triethyleneglycol 2,2,4-trimethylpentane-1,3-diol, 2,2-dimethyl-3-hydroxypropyl 2,2-dimethyl-3-hydroxypropionate and 1,4-cyclohexanedimethanol. Preferred are those aliphatic diols or triols selected from the class consisting of neopentyl glycol, 2,2,4-trimethylpentane-1,3-diol, 2,2-dimethyl-3-hydroxypropy-2,2-dimethyl-3-hydroxypropionate, diethylene glycol, 2-methyl-1,3-propanediol, dipropylene glycol, 1,6-hexanediol, and trimethylolpropane. As noted, triols, such as trimethylolpropane may be used at low levels to provide branching. Higher functionality polyols such as tetrols can be used but they are not preferred, and if used are used at very low levels. An example of a tetrol would be 1,2,3,4-butanetetrol.

Anhydrides of formula (I), such as DDSA and octadecenylsuccinic anhydride in the low molecular weight polyesters of the present invention provide low viscosity to liquid polyester compositions and enhanced flexibility of cured coatings. Anhydrides of formula (I) may be used as the only anhydride(s), but typically are used in conjunction with other anhydrides, such as succinic anhydride, methylsuccinic anhydride, phthalic anhydride, tetrahydrophthalic anhydride, methyltetrahydrophthalic anhydride, hexahydrophthalic anhydride, methylhexahydrophthalic anhydride, tetrachlorophthalic anhydride, endomethylene tetrahydrophthalic anhydride, chlorendic anhydride, itaconic anhydride, citraconic anhydride, and maleic anhydride.

Anhydrides of formula (I) comprise between about 10 and about 50 wt % of the monomers used to form the polyester composition, preferably between about 20 and about 40 wt %. The total anhydride monomer content varies over a range of 0.3:1.00 to 1.00:1.00, on a molar basis to the hydroxyl equivalent of the polyol content, whereby the anhydride content reacts with the polyol content in an ester-forming reaction so as to provide a carboxyl-terminated chain composition. The molar ratio of the anhydride content to the hydroxyl equivalent of the polyol content may vary in a range of 0.3:1.00 to 1.00:1.00, preferably in a range of 0.90:1.00 to 1.00:1.00, and most preferably in a range of 0.95:1.00 to 1.00:1.00.

Suitable oxirane compounds for reaction with the carboxyl-terminated chain composition are mono-functional epoxies, including, but not limited to ethylene oxide, propylene oxide, butylene oxide, cyclohexene oxide, limonene oxide, styrene oxide, butyl glycidyl ether, glycidyl ether, and mixtures thereof. The ratio of oxirane compounds to the anhydride compounds used to form the polyester composition, varies over a molar ratio range of 0.020:1.000, preferably over a range of 0.080:1.000, preferably a mole ratio of between about 0.9:1 and about 1.1:1.

The lowest molecular polyester compositions of the present invention are formed in two steps. The first step is reaction of the anhydride with the polyol to form the carboxyl-terminated chain composition and the second step is reaction of the carboxyl-terminated chain composition with the oxirane. This results in a short-chain polyester having hydroxyl functionality that is terminal. Stepwise formation of polyester compositions in this manner, including the use of catalysts to enhance the respective reactions, is well known in the art, e.g., in above-referenced U.S. Pat. No. 4,403,093. As a result of the polyester composition being formed in this stepwise fashion, the chains are short, i.e., low molecular weight, and polydispersity is low. Theoretically, for example, using a single diol species, a single anhydride species at a 1:1 mole/OH equivalent ratio, and a single oxirane species at a 1:1 mole/COOH equivalent ratio, polymer chains 5 monomer units long would be formed, including a central diol monomer, diol-flanking anhydride monomers, and terminal oxirane monomers. In practice, however, mixtures of diols, mixtures of anhydrides, and, optionally, mixtures of oxiranes are used, including monomers, particularly polyols or anhydrides, such as trimellitic anhydride, having functionality of greater than two. Accordingly, the composition of the individual polyester chains will generally vary somewhat in monomer composition and molecular weight. While some monomer having functionality greater than 2 may be used, it is highly desired that the functionality of the polyester chain not exceed 3, lest cross-link density be too high, resulting in brittleness.

To form a curable composition, such as a coating composition, the polyester compositions, as described above, are combined with a cross-linking agent. The cross-linking agent is one which is capable of reacting with the active hydrogens (primarily —OH hydrogens) in the polyester to give a thermoset composition upon curing. Examples of suitable cross-linking agents are aminoplasts and polyisocyanates including blocked polyisocyanates.

Aminoplasts are obtained by the condensation reaction of formaldehyde with an amine or an amide. The most common amines or amides are melamine, urea or benzoguanamine. However, condensation with other amines or amides can be employed. While the aldehyde employed is most often formaldehyde, other aldehydes such as acetaldehyde, crotonaldehyde, benzaldehyde and furfural may be used. The aminoplast contains methylol or similar alkylol groups, and preferably, at least a portion of these alkylol groups are etherified by reaction with alcohol to provide organic solvent-soluble resins. Any monohydric alcohol can be employed for this purpose including such alcohols as methanol, ethanol, butanol and hexanol. Preferably, the aminoplasts which are used are melamine-, urea- or benzoguanamine-formaldehyde condensates etherfied with an alcohol containing 1 to 4 carbon atoms such as methanol, ethanol, butanol or mixtures thereof.

The amount of aminoplast which is used from about 10 to 70 percent by weight, preferably 15 to 50 percent by weight, based on total weight of the aminoplast and polyester. Amounts less than 10 percent by weight usually result in insufficient cure, whereas amounts greater than 70 percent by weight serve no particular benefit.

Polyisocyanates and blocked polyisocyanates may also be used as curing agents. Examples of suitable polyisocyanates include monomeric polyisocyanates such as toluene disocyanate and 4,4'-methylene-bis(cyclohexyl isocyanate), isophorone diisocyanate and NCO-prepolymers such as the reaction products of monomeric polyisocyanate such as those mentioned above with polyester or polyether polyols. A particularly useful isocyanate is the biuret from 1,6-hexamethylene diisocyanate commercially available from Bayer® AG as Desmodur® N.

The polyisocyanate may optionally be blocked. Examples of suitable blocking agents are those materials which would unblock at elevated temperatures such as caprolactam. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application. The amount of isocyanate or blocked poyisocyanate curing agent which is used can vary between about 0.2 to 1.5, preferably from 0.3 to 1.3 equivalents of NCO per equivalent of active hydrogen of the polyester. On a weight basis, the ratio of isocyanate or blocked isocyanate curative relative to polyester is generally within the ranges of weight ratios of aminoplast curative to polyester set forth above.

Because polyester compositions incorporating significant amounts of anhydride monomer of formula (I) have low viscosities, very high solids solutions of the polyesters in organic solvent can be formed and utilized in coating compositions. This affords coating compositions having low VOCs.

The high solids coating compositions preferably contain greater than 50 percent non-volatile solids by volume and contain most preferably greater than 60 percent non-volatile solids by volume.

Besides the polyester oligomer and optionally the crosslinking agent, the high solids coating composition can optionally contain other hydroxyl functional polymers, pigment, liquid diluent, plasticizer, anti-oxidants. UV light absorbers, surfactants, flow control agents, as is well known in the art. Examples of flow control agents are crosslinked polymeric microparticles such as described in U.S. Pat. No. 4,147,688.

Coating compositions employing the polyesters of the present invention are especially suitable for application by coil coating and by spraying, although other conventional methods of coating including brushing, dipping and flow coating can be employed, if desired. Usual spray techniques and equipment are utilized. High solids coatings using the polyesters of the present invention can be applied virtually over any substrate including wood, metal, glass, cloth, plastic, foams and the like, as well as over various primers. Coating compositions employing the polyesters of the present invention are useful for a wide variety of applications. They can be used for coating automotive parts such as automobile bodies and truck cabs. Also, they can be used for other coating applications such as coatings for appliance parts such as refrigerators and washing machines.

In general, coating thicknesses will vary depending upon the application desired. In general, coatings from about 0.1 to 5 mils have been found to be useful in most applications, and coatings from about 0.8 to 1.2 mils have been found to be more useful.

After application to the substrate, the coatings are cured. Curing is usually conducted at temperatures of about 100° to 260° C., and in most cases, the cure schedule is from about 15 seconds to about 30 minutes. Higher or lower temperatures with correspondingly longer or shorter times can be utilized, although the exact cure schedule best employed depends upon the nature of the substrate, as well as the particular components used in formulating the coating compositions. If a coating is applied on a coil line, the composition is typically cured in a coil oven with a temperature and dwell time determined according to the particular coating composition. With aminoplast curing agents, acid catalysts can be employed, if desired, as they usually permit the use of lower temperature and shorter times for cure.

The polyester compositions of the present invention may be used as the sole polyester component of a coating composition, and coatings formed from such a composition exhibit surprisingly good flexibility.

Polyester compositions of the present invention are also found to be advantageously used as additives to polyester coating compositions, such as those used in coil coating operations. In polyester coating compositions, polyesters typically have number average molecular weights of between about 2000 and about 3000 and OH numbers between about 30 and about 50. Using the same polyesters as the major polyester, i.e., between about 70 and about 90 wt % of the total polyester content, in conjunction with a polyester composition in accordance with the invention as a minor polyester, i.e., between about 10 and about 30 wt %, certain advantages are achieved. Coating solids levels can be raised, improved pigment wetting is observed, and surface defects of the applied and cured coating are removed or eliminated.

The invention will be farther described by reference to the following examples. Unless otherwise indicated, all parts are by weight.

EXAMPLE 1

Polyester 1 is formulated as follows (wt. percentages based on 100% solids, 99.98% of which are monomer components of polyester):

| | | | |
|---|---|---|---|
| 1. | MP Diol[1] (Arco) | monomer | 0.50 |
| 2. | TMP | monomer | 5.19 |
| 3. | Phthalic anhydride | monomer | 31.45 |
| 4. | HHPA[2] | monomer | 0.50 |
| 5. | 1,6-hexanediol | monomer | 12.00 |
| 6. | DDSA[3] | monomer | 30.60 |
| 7. | Triphenyl phosphite | oxidation inhibitor | 0.02 |
| 8. | Butyl acetate | solvent | 15.12 |
| 9. | dimethylbenzylamine | catalyst | 0.24 |
| 10. | propylene oxide | monomer | 19.50 |
| 11. | butyl acetate | solvent | 2.53 |
| | Solids charge 100 wt % | | |
| | Theoretical Loses -- | | |
| | Solids Yield 100.00 | | |
| | Solution Yield 117.65 | | |

[1]2-methyl- 1,3-propanediol
[2]hexahydro phthalic anhydride
[3]dodecenyl succinic anhydride (Milliken)

Cooling water was applied to a reactor. Components 1–7 were charged while purging the reactor with inert gas. The reactor was sealed and slowly heated to 65°–80° C. to melt the components. Onset of an exotherm was observed. Cooling was as necessary to maintain the temperature below 140°–145° C. The reaction mixture was held for 15 minutes at the peak of the exotherm. The reaction mixture was cooled to 105°–115° C., and components 8 and 9 were added. Mixing was for 15 minutes and the temperature was adjusted to 100 ° C. Acid value and viscosity was measured for this first stage.

With the reaction mixture at 100 ° C., component 10 was added as quickly as it would go in. The temperature was raised to 115°–120° C. and held until the acid value was reduced to 1.7–4.3. (If necessary, additional (excess) propylene oxide is added to achieve the desired acid value.) Properties of the polyester composition are as follows:

| | |
|---|---|
| Viscosity (at 85% solids) | U–W |
| Non-volatile materials | 85 ± 1 |
| Solvent | butyl acetate |
| Color | 6 max. |
| AV/NV (acid value based on solids) | 2–5 |

-continued

| Weight Per Gallon (WPG) | 9.05 ± 00.10 |
| OHN/NV (hydroxyl number based on solids) | 200 ± 15 |
| Appearance | Clear |
| NV (non-volatile volume) | 81.5% |
| Flash Point | 27.8° C. |

EXAMPLE 2

A white coating composition using polymer 1 is formulated as follows:

| Component | Function | Lbs. | Gals. |
|---|---|---|---|
| Polymer 1 | | 19.478 | 2.152 |
| Disperbyk ® 110 | Dispersing agent | 0.335 | 0.40 |
| n-pentyl propionate | Solvent | 0.726 | 0.99 |
| SC-100 | Aromatic Solvent | 1.351 | 0.186 |
| Bentone ® SD-2 | Thixotropic agent Sift in under agitation | 0.201 | 0.014 |
| TiO$_2$ | Pigment Sandgrind to 7 + NS | 42.348 | 1.312 |
| Thindown | | | |
| Polymer 1 | | 9.142 | 1.010 |
| R-1239 | Flexibilizing polyester | 3.996 | 0.451 |
| Epon ® 828 | Epoxy | 0.614 | 0.065 |
| Cymel ® 303 | Melamine cross-linker | 14.812 | 1.481 |
| Methylamylketone | Solvent | 1.830 | 0.882 |
| n-pentyl propionate | Solvent | 0.269 | 0.120 |
| Add following two components under agitation | | | |
| Nacure ® XP-383 | Acid catalyst | 0.558 | 0.68 |
| Nacure ® 2558 | Acid catalyst | 0.558 | 0.68 |
| Premix following two components and add | | | |
| DC-200 (10 cts visc) | Silicone flow control agent | 0.022 | 0.003 |
| SC-100 | Aromatic solvent | 0.201 | 0.028 |
| Mix the following two solvents for adjusting viscosity and VOC | | | |
| n-pentyl propionate | Solvent | 1.473 | 0.203 |
| n-butyl acetate | Solvent | 1.473 | 0.201 |
| | | 100.00 | 7.76 |

% non-volatile 86.29 wt/gal 12.88
VOC about 1.77

The coating composition was applied by electrostatic disc to phosphatized steel at a wet film thickness of 1.35 mil, dried and baked for 10' at 350° F. A dry film of 1 mil thickness was achieved having 2H pencil hardness, 60° gloss of 94 and direct and reverse impact values of 80.

EXAMPLE 3

Polyester 2 is formulated as follows (wt. percentages based on 100% solids, 99.98% of which are monomer components of polyester):

| | | | |
|---|---|---|---|
| 1. | MP Diol$^1$ (Arco) | monomer | 5.73 |
| 2. | TMP | monomer | 0.49 |
| 3. | Phthalic anhydride | monomer | 0.49 |
| 4. | HHPA$^2$ | monomer | 32.66 |
| 5. | 1,6-hexanediol | monomer | 11.67 |
| 6. | DDSA$^3$ | monomer | 30.08 |
| 7. | Triphenyl phosphite | oxidation inhibitor | 0.02 |
| 8. | Butyl acetate | solvent | 14.85 |
| 9. | dimethylbenzylamine | catalyst | 0.25 |
| 10. | propylene oxide | monomer | 18.86 |
| 11. | butyl acetate | solvent | 2.55 |
| Solids charge 100 wt % | | | |
| Theoretical Loses -- | | | |

Solids Yield 100.00
Solution Yield 117.65

$^1$2-methyl-1,3-propanediol
$^2$hexahydro phthalic anhydride
$^3$dodecenyl succinic anhydride (Milliken)

Cooling water was applied to a reactor. Components 1–7 were charged while purging the reactor with inert gas. The reactor was sealed and slowly heated to 65°–80° C. to melt the components. Onset of an exotherm was observed. Cooling was as necessary to maintain the temperature below 140°–145° C. The reaction mixture was held for 15 minutes at the peak of the exotherm. The reaction mixture was cooled to 105°–115° C., and components 8 and 9 were added. Mixing was for 15 minutes and the temperature was adjusted to 100 ° C. Acid value and viscosity was measured for this first stage.

With the reaction mixture at 100° C., component 10 was added as quickly as it would go in. The temperature was raised to 115°–120° C. and held until the acid value was reduced to 1.7–4.3. (If necessary, additional (excess) propylene oxide is added to achieve the desired acid value.) Properties of the polyester composition are as follows:

| Viscosity (at 85% solids) | L–O |
| Non-volatile materials | 85 ± 1 |
| Solvent | butyl acetate |
| Color | 6 max. |
| AV/NV (acid value based on solids) | 2–5 |
| Weight Per Gallon (WPG) | 9.00 ± 00.10 |
| OHN/NV (hydroxyl number based on solids) | 246 ± 15 |
| Appearance | Clear |
| NV (non-volatile volume) | 81.6 |
| Flash Point | 27.8° C. |

Polymer 2 may be substituted for Polymer 1 in the coating formulation of Example 2.

EXAMPLE 4

Polyester 3 is formulated as follows (wt. percentages based on 100% solids, 99.98% of which are monomer components of polyester):

| | | | |
|---|---|---|---|
| 1. | MP Diol$^1$ (Arco) | monomer | 40.61 |
| 2. | TMP | monomer | 0.42 |
| 3. | Phthalic anhydride | monomer | 27.66 |
| 4. | HHPA | monomer | 0.42 |
| 5. | 1,6-hexanediol | monomer | 9.93 |
| 6. | DDSA | monomer | 25.60 |
| 7. | Fascat 4100 | catalyst | 0.09 |
| 8. | Triphenyl phosphite | oxidation inhibitor | 0.02 |
| 9. | Butyl acetate | solvent | 18.53 |
| 10. | N,N-Dimethylbenzylamine | catalyst | 0.02 |
| 11. | propylene oxide | monomer | 0.38 |
| 12. | butyl acetate | solvent | 1.05 |

$^1$2-methyl-1,3-propanediol

Cooling water was applied to reactor. Components 1–8 were charged while purging with inert gas. The reactor was sealed and slowly heated to 65°–80° C. to melt components, onset of exotherm was observed and reaction temperature maintained at 80° C. for 1 hour. The reactor is heated to 230°

C., and viscosity and acid value monitored until a maximum value of 10 was obtained. The reactor is cooled to 130° C., and then items 9 and 10 are added. Item 11 is charged to reactor over a 30 minute interval and reactor held at 130 ° C. for 1 hour. The acid value and viscosity were measured until an acid value of 3.0 to 5.0 was obtained (additional item 11 was added if necessary to obtain the desired acid value).

The properties of the polyester composition are as follows:

| Viscosity (at 85% solids) | W– |
|---|---|
| Non-volatile materials | 81.8 |
| Solvent | butyl acetate |
| Color | 2–3 |
| AV/NV (acid value based on solids) | 3.6 |
| Weight Per Gallon (WPG) | 8.80 |
| OHN/NV (hydroxyl number based on solids) | 182.8 |
| Appearance | Clear |
| NV (non-volatile volume) | 78.2 |
| Flash Point | 27.8° C. |

Polymer 3 may be substituted for Polymer 1 in the coating formulation of Example 2.

EXAMPLE 5

Polyester 4 is formulated as follows (wt. percentages based on 100% solids, 99.98% of which are monomer components of polyester):

| 1. | MP Diol (Arco) | monomer | 33.78 |
|---|---|---|---|
| 2. | TMP | monomer | 0.47 |
| 3. | Phthalic anhydride | monomer | 30.21 |
| 4. | HHPA | monomer | 0.47 |
| 5. | 1,6-hexanediol | monomer | 11.24 |
| 6. | DDSA | monomer | 28.97 |
| 7. | Pascat 4100 | catalyst | 0.11 |
| 8. | Triphenyl phosphite | oxidation inhibitor | 0.02 |
| 9. | Butyl acetate | solvent | 8.37 |
| 10. | N,N-Dimethylbenzylamine | catalyst | 0.02 |
| 11. | propylene oxide | monomer | 0.40 |
| 12. | butyl acetate | solvent | 1.00 |

Cooling water was applied to reactor. Components 1–8 were charged while purging with inert gas. The reactor was sealed and slowly heated to 65°–80° C. to melt components, onset of exotherm was observed and reaction temperature maintained at 80° C. for 1 hour. The reactor is heated to 230° C., and viscosity and acid value monitored until a maximum value of 10 was obtained. The reactor is cooled to 130° C., and then items 9 and 10 are added. Item 11 is charged to reactor over a 30 minute interval and reactor held at 130° C. for 1 hour. The acid value and viscosity were measured until an acid value of 3.0 to 5.0 was obtained (additional item 11 was added if necessary to obtain the desired acid value). The properties of the polyester composition are as follows:

| Viscosity (at 85% solids) | Y–Z |
|---|---|
| Non-volatile materials | 84.5 |
| Solvent | butyl acetate |
| Color | 2–3 |
| AV/NV (acid value based on solids) | 1.72 |
| Weight Per Gallon (WPG) | 8.87 |
| OHN/NV (hydroxyl number based on solids) | 185.4 |
| Appearance | Clear |
| NV (non-volatile volume) | 81.3 |
| Flash Point | 27.8° C. |

Polymer 4 may be substituted for Polymer 1 in the coating formulation of Example 2.

EXAMPLE 6

Polyester 5 is formulated as follows (wt. percentages based on 100% solids, 99.98% of which are monomer components of polyester):

| 1. | MP Diol (Arco) | monomer | 28.94 |
|---|---|---|---|
| 2. | TMP | monomer | 4.38 |
| 3. | Phthalic anhydride | monomer | 29.46 |
| 4. | HHPA | monomer | 0.46 |
| 5. | 1,6-hexanediol | monomer | 11.92 |
| 6. | DDSA | monomer | 28.67 |
| 7. | Fascat 4100 | catalyst | 0.10 |
| 8. | Triphenyl phosphite | oxidation inhibitor | 0.01 |
| 9. | Butyl acetate | solvent | 11.73 |
| 10. | N,N-Dimethylbenzylamine | catalyst | 0.02 |
| 11. | propylene oxide | monomer | 1.59 |

Cooling water was applied to reactor. Components 1–8 were charged while purging with inert gas. The reactor was sealed and slowly heated to 65°–80° C. to melt components, onset of exotherm was observed and reaction temperature maintained at 80° C. for 1 hour. The reactor is heated to 230° C., and viscosity and acid value monitored until a maximum value of 35 was obtained. The reactor is cooled to 130° C., and then items 9 and 10 are added. Item 11 is charged to reactor over a 30 minute interval and reactor held at 130° C. for 1 hour. The acid value and viscosity were measured until an acid value of 3.0 to 5.0 was obtained (additional item 11 was added if necessary to obtain the desired acid value). The properties of the polyester composition are as follows:

| Viscosity (at 85% solids) | Y– |
|---|---|
| Non-volatile materials | 83.9 |
| Solvent | butyl acetate |
| Color | 2 |
| AV/NV (acid value based on solids) | 1.8 |
| Weight Per Gallon (WPO) | 9.01 |
| OHN/NV (hydroxyl number based on solids) | 245.2 |
| Appearance | Clear |
| NV (non-volatile volume) | 80.2 |
| Flash Point | 27.8° C. |

Polymer 5 may be substituted for Polymer 1 in the coating formulation of Example 2.

EXAMPLE 7

Polyester 6 is formulated as follows (wt. percentages based on 100% solids, 99.98% of which are monomer components of polyester):

| 1. | MP Diol (Arco) | monomer | 30.72 |
|---|---|---|---|
| 2. | TMP | monomer | 4.35 |
| 3. | Phthalic anhydride | monomer | 29.23 |
| 4. | HHPA | monomer | 0.46 |
| 5. | 1,6-hexanediol | monomer | 11.83 |
| 6. | DDSA | monomer | 28.45 |
| 7. | Fascat 4100 | catalyst | 0.10 |
| 8. | Triphenyl phosphite | oxidation inhibitor | 0.01 |
| 9. | Butyl acetate | solvent | 11.73 |
| 10. | N,N-Dimethylbenzylamine | catalyst | 0.02 |
| 11. | propylene oxide | monomer | 0.37 |

Cooling water was applied to reactor. Components 1–8 were charged while purging with inert gas. The reactor was sealed and slowly heated to 65°–80° C. to melt components, onset of exotherm was observed and reaction temperature maintained at 80° C. for 1 hour. The reactor is heated to 230° C., and viscosity and acid value monitored until a maximum value of 10 was obtained. The reactor is cooled to 130° C., and then items 9 and 10 are added. Item 11 is charged to reactor over a 30 minute interval and reactor held at 130° C. for 1 hour. The acid value and viscosity were measured until an acid value of 3.0 to 5.0 was obtained (additional item 11 was added if necessary to obtain the desired acid value). The properties of the polyester composition are as follows:

| | |
|---|---|
| Viscosity (at 85% solids) | Y–Z |
| Non-volatile materials | 84.2 |
| Solvent | butyl acetate |
| Color | 2–3 |
| AV/NV (acid value based on solids) | 3.0 |
| Weight Per Gallon (WPG) | 8.91 |
| OHN/NV (hydroxyl number based on solids) | 210.4 |
| Appearance | Clear |
| NV (non-volatile volume) | 80.8 |
| Flash Point | 27.8° C. |

Polymer 6 may be substituted for Polymer 1 in the coating formulation of Example 2.

EXAMPLE 8

Polyester 7 is formulated as follows (wt. percentages based on 100% solids, 99.98% of which are monomer components of polyester):

| | | | |
|---|---|---|---|
| 1. | MP Diol (Arco) | monomer | 32.73 |
| 2. | TMP | monomer | 0.47 |
| 3. | Phthalic anhydride | monomer | 0.47 |
| 4. | HHPA | monomer | 32.73 |
| 5. | 1,6-hexanediol | monomer | 11.19 |
| 6. | DDSA | monomer | 28.83 |
| 7. | Fascat 4100 | catalyst | 0.10 |
| 8. | Triphenyl phosphite | oxidation inhibitor | 0.02 |
| 9. | Butyl acetate | solvent | 12.35 |
| 10. | N,N-Dimethylbenzylamine | catalyst | 0.04 |
| 11. | propylene oxide | monomer | 0.52 |
| 12. | butyl acetate | solvent | 3.90 |

Cooling water was applied to reactor. Components 1–8 were charged while purging with inert gas. The reactor was sealed and slowly heated to 65°–80° C. to melt components, onset of exotherm was observed and reaction temperature maintained at 80° C. for 1 hour. The reactor is heated to 230° C., and viscosity and acid value monitored until a maximum value of 10 was obtained. The reactor is cooled to 130° C., and then items 9 and 10 are added. Item 11 is charged to reactor over a 30 minute interval and reactor held at 130° C. for 1 hour. The acid value and viscosity were measured until an acid value of 3.0 to 5.0 was obtained (additional item 11 was added if necessary to obtain the desired acid value). The properties of the polyester composition are as follows:

| | |
|---|---|
| Viscosity (at 85% solids) | X– |
| Non-volatile materials | 84.9 |
| Solvent | butyl acetate |
| Color | 2–3 |
| AV/NV (acid value based on solids) | 3.6 |
| Weight Per Gallon (WPG) | 8.80 |
| OHN/NV (hydroxyl number based on solids | 179.3 |
| Appearance | Clear |
| NV (non-volatile volume) | 81.9 |
| Flash Point | 27.8° C. |

Polymer 7 may be substituted for Polymer 1 in the coating formulation of Example 2.

EXAMPLE 9

A white coating composition using polymer 5 is formulated as follows:

| COMPONENT | FUNCTION | LBS. | GALS. |
|---|---|---|---|
| R-2643 | Polyester Resin | 185.2 | 21.4 |
| Methyl isoamyl ketone | Solvent | 61.7 | 9.1 |
| | Sift in under agitation | | |
| TiO$_2$ | Pigment | 370.5 | 11.5 |
| | Sandgrind to 7.5 Hegman Thindown | | |
| R-2643 | Polyester Resin | 326.7 | 37.7 |
| Resimene 751 | Melamine cross-linker | 85.06 | 9.7 |
| Polymer 5 | Polyester Resin | 68.16 | 7.7 |
| R-3571 | Polyester Resin | 13.23 | 1.6 |
| Epon 828 | Epoxy Resin | 9.03 | 0.9 |
| | Add following component under agitation | | |
| Nacure 1557 | Acid catalyst | 9.88 | 1.3 |
| | Premix following two components and add | | |
| Silwet L-7500 | Silicone Flow Control Agent | 2.47 | 0.3 |
| Coroc A-620-A2 | Acrylic Resin | 0.74 | 0.1 |
| | Mix the following three solvents for adjusting viscosity and VOC | | |
| n-Butanol | Solvent | 22.2 | 3.3 |
| Acetone | Solvent | 22.2 | 3.4 |
| Butyl Carbitol Acetate | Solvent | 22.2 | 2.7 |
| % non-volatile | 70.3 | | |
| wt./gal | 10.84 | | |
| VOC | 3.0 | | |

The coating composition was applied by coil coating to Aluminum metal (1500 Pretreatment) at a wet film thickness of 1.45 mils, dried and baked for 22 secs. to achieve a PMT of 450° F. A dry film of 0.8 mil thickness was achieved having H pencil hardness, OT, 60° gloss of 95.2.

EXAMPLE 10

A white coating composition using polymer 5 is formulated as follows:

| COMPONENT | FUNCTION | LBS. | GALS. |
|---|---|---|---|
| R-4350 | Polyester Resin | 33.19 | 3.77 |
| PM Acetate | Solvent | 2.73 | 0.34 |
| | Sift in under agitation | | |
| TiO$_2$ | Pigment | 37.99 | 1.18 |
| | Sandgrind to 7.5 Hegman Thindown | | |
| R-4350 | Polyester Resin | 3.00 | 0.34 |
| Polymer 5 | Polyester Resin | 7.96 | 0.90 |
| Resimene 751 | Melamine cross-linker | 9.09 | 1.03 |
| R-3571 | Acrylic Resin | 1.06 | 0.12 |
| Coroc A-620-A2 | Acrylic Resin | 0.21 | 0.03 |
| | Premix following two components and add | | |
| Versaflow Base | Polyethylene Resin | 0.21 | 0.03 |
| Silwet L-7500 | Silicone Flow Control Agent | 0.21 | 0.03 |
| | Add following component under agitation | | |
| Nacure 1051 | Acid catalyst | 0.42 | 0.05 |
| Epon 1001 | Epoxy Resin | 1.82 | 0.20 |
| | Add the following solvent for adiusting viscosiiy and VOC | | |
| n-Butanol | Solvent | 2.11 | 0.31 |
| % non-volatile | 80.0 | | |
| wt./gal | 12.0 | | |
| VOC | 2.40 | | |

The coating composition was applied by coil coating to Aluminum metal (1500 Pretreatment) at a wet film thickness of 1.19 mils, dried and baked for 30 secs. to achieve a PMT of 450° F. A dry film of 0.8 mil thickness was achieved having H pencil hardness, IT, 60° gloss of 93.5.

What is claimed is:

1. A polyester composition having a number average molecular weight $M_n$ of between about 500 and about 1000, a weight average molecular weight $M_w$ of between about 600 and about 2000, a polydispersity below about 2, a hydroxyl functionality of between 2 and 3, a hydroxyl value of between about 160 and about 260, and an acid number less than about 10, not more than about 5% of the hydroxyl groups being pendent, between about 10 and about 50 wt % of the monomers used to form the polyester composition are anhydrides having the formula:

 (I)

where $R^1$ is a non-aromatic, saturated or unsaturated hydrocarbon chain having between 6 and 30 carbon atoms, $R^2$ is hydrogen or a non-aromatic saturated or unsaturated hydrocarbon having between 1 and 8 carbon atoms, and $R^1$ and $R^2$ have, in total, between 8 and 30 carbon atoms.

2. The polyester in accordance with claim 1 wherein said anhydrides of formula (I) comprise dodecenylsuccinic anhydride.

3. A polyester composition in accordance with claim 1 having a polydispersity of about 1.8 or below.

4. A composition comprising the polyester of claim 1 in combination with a hydroxyl-reactive curative.

5. A polyester composition in accordance with claim 1 formed from the polycondensation of carboxylic anhydride and polyol at a molar ratio of anhydride to the hydroxyl equivalent of the polyol in the range of 0.3:1.00 to 1.00:1.00 followed by reaction with a mono-functional oxirane compound at a ratio of oxirane to anhydride in the range of 0.020:1.000 to 1.100:1.000.

6. A polyester composition of claim 5 wherein said molar ratio of anhydride to the hydroxyl equivalent of the polyol is 0.3:1.00 and a ratio of oxirane to anhydride is 0.020:1.000.

7. A polyester composition of claim 5 wherein said molar ratio of anhydride to the hydroxyl equivalent of the polyol is 0.3:1.00 and a ratio of oxirane to anhydride is 0.080:1.000.

8. A polyester composition of claim 5 wherein said molar ratio of anhydride to the hydroxyl equivalent of the polyol is 1.00:1.00 and a ratio of oxirane to anhydride is 1.000:1.000.

* * * * *